Feb. 28, 1956  C. J. CHRISTIANSON  2,736,195
INSTRUMENT FOR PAINT TESTING

Filed March 15, 1954  3 Sheets-Sheet 1

INVENTOR
CONRAD J. CHRISTIANSON
BY
ATTORNEY

Feb. 28, 1956 C. J. CHRISTIANSON 2,736,195
INSTRUMENT FOR PAINT TESTING
Filed March 15, 1954 3 Sheets-Sheet 2

INVENTOR.
CONRAD J. CHRISTIANSON

INVENTOR.
CONRAD J. CHRISTIANSON

United States Patent Office 2,736,195
Patented Feb. 28, 1956

2,736,195

INSTRUMENT FOR PAINT TESTING

Conrad J. Christianson, Markham, Ill., assignor to The Sherwin-Williams Company, Cleveland, Ohio, a corporation of Ohio Application March 15, 1954, Serial No. 416,340

5 Claims. (Cl. 73—101)

This invention relates to a device for investigating changes in the physical condition of solid-in-liquid suspensions upon aging, particularly in relation to settling and the nature of the settlement of paint.

The invention herein described provides means for initial determination of the hardness of the cake which may form in the bottom of a paint container by a measurement of penetration rate into said cake, and thereafter provides a means for measurement of the depth of the cake as well as the torque essential to disruption or shear of the settlement or cake. These measurements, when comparative on a series of paint samples under examination, provide the coatings formulator with information of invaluable aid in research toward overall improvement of protective and decorative coatings.

It is the objective of this invention to provide a means for determining the nature of the settlement in paints by measurement of rate of penetration into the paste accumulated in the bottom of the container, by measurement of the amount or depth of cake and by the resistance of the cake to standardly applied disruptive forces acting in torque upon the settlement or cake by means of a single instrument.

Other objectives will be apparent as the drawings and the description accompanying the drawings clarify the details of a preferred embodiment of the instrument.

Referring to the drawings.

Figure 1:
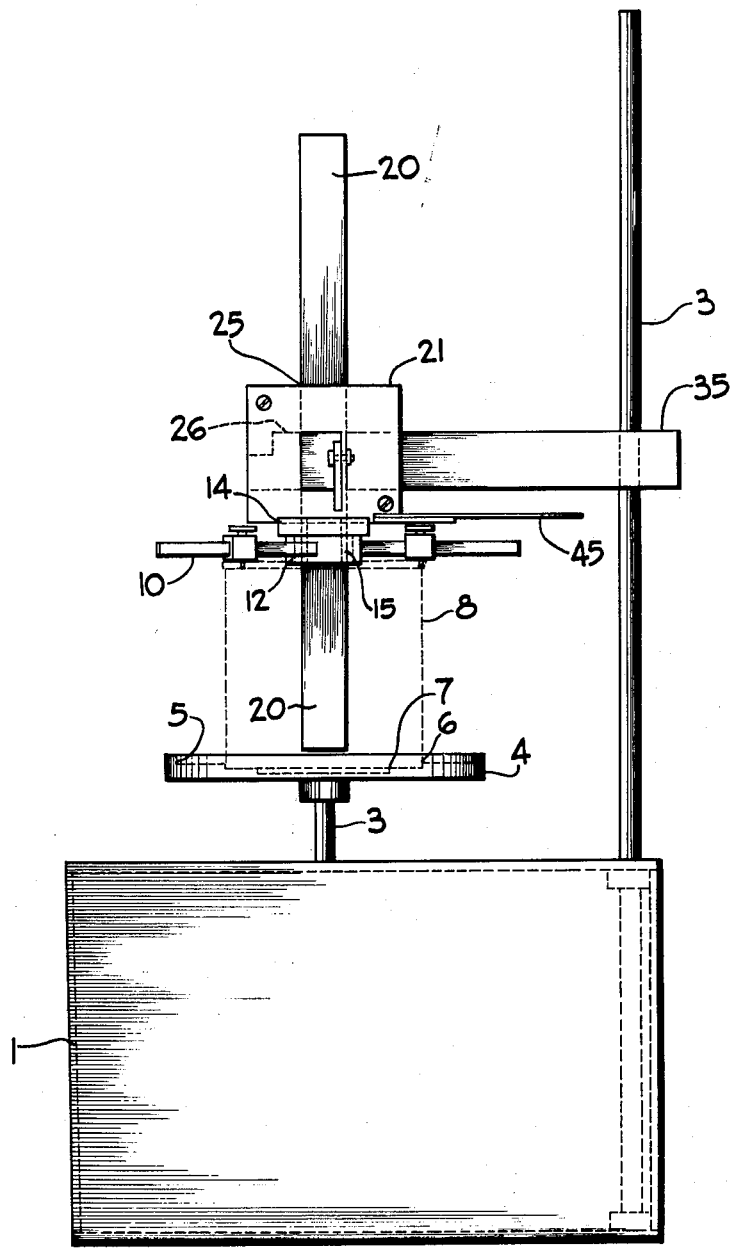
Figure 1 is a side view of the instrument in operative position over a standard container.
Figure 2:
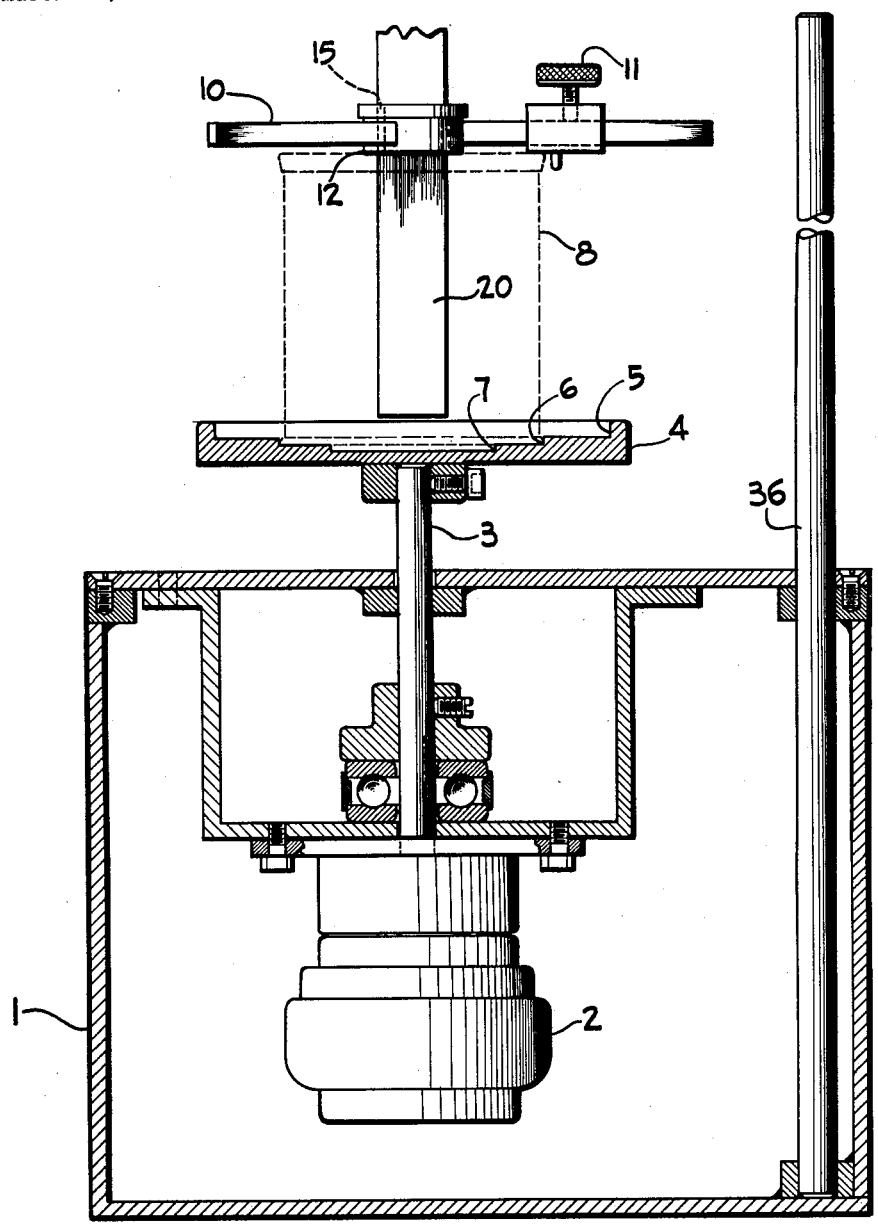
Figure 2 is an enlarged vertical sectional side view of the base of the instrument with parts broken away and removed.

Referring more generally to the drawings, base 1 supports a constant speed motor 2 which rotates at from about one quarter revolution to not more than about five revolutions per minute driving shaft 3 and turntable 4 at a corresponding speed of rotation. Preferably, turntable 4 is adapted to receive a variety of sizes of standard containers including gallons 5, quarts 6, and pints 7. Adaptation to standard containers normally used in the paint industry facilitates testing of various commercial packages for settlement. If it were essential to transfer to a secondary container, this requirement would seriously interfere, as settlement tests require long periods of time to elapse for the condition of interest to occur.

Figure 3:
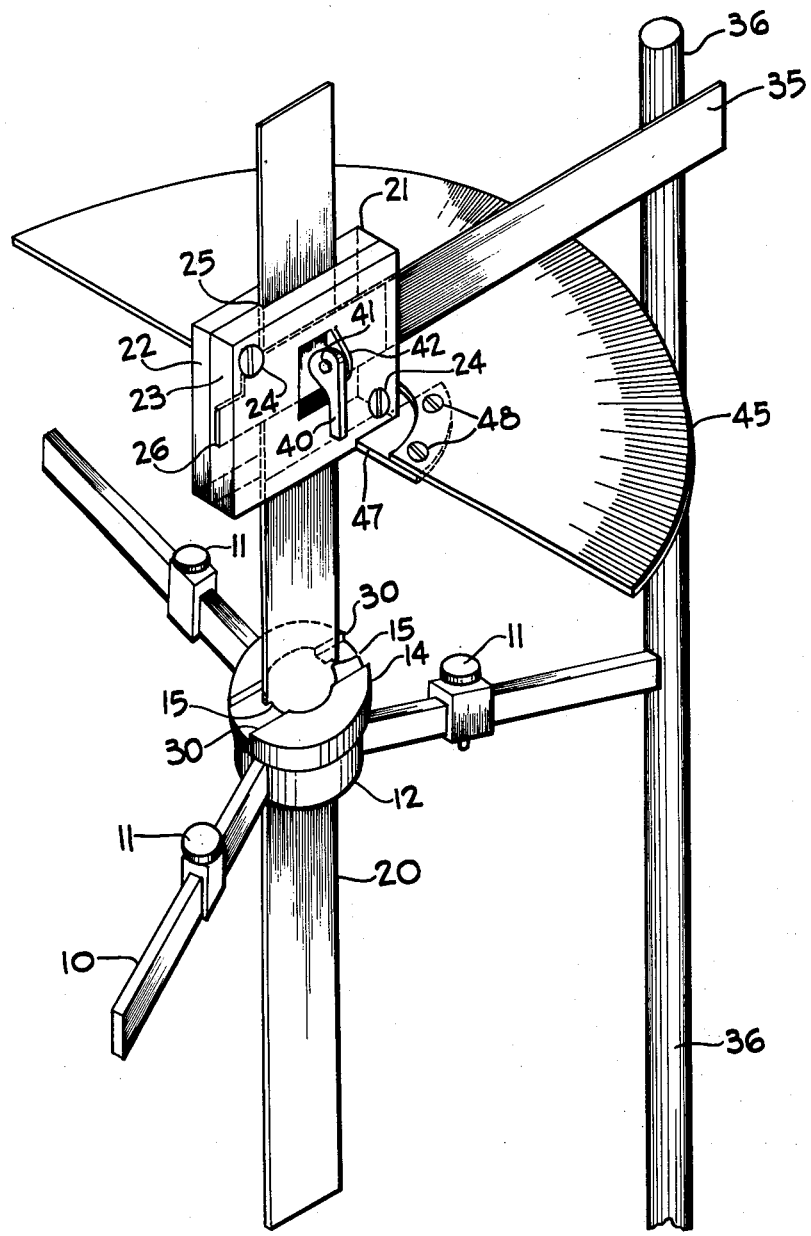
Figure 3 is an enlarged perspective view, the base section having been broken away and removed.

In testing, a container as shown dotted 8 is placed on the turntable 4, illustratively occupying the quart area 6 thereof. A bearing support 10, having adjustable feet 11 is centered over the container 8, toes in said feet adapted to be hooked into the top container circumferential groove or alternatively, brought tightly in contact with the exterior circumference of the container bead, said toes grasping about the circumferential container bead. While the bearing support 10 may be of a variety of forms, a trivet, as shown in Figure 3 is convenient, having a collar-bearing 12 in which thrust bearing 14 is free to rotate. Interiorly of bearing 14 is a double keyway 15, said ways at 180° to one another, extending vertically through thrust bearing 14 which allows blade 20 to be slid upwards and downwards, yet firmly secured, within the slot so formed. Initial tests are made with the instrument. One may measure the time required for blade 20 to penetrate the settlement for a given or standard distance. Weights may be added to blade 20 to increase the rate of penetration. After penetration rate measurement, clamp 21 split into halves 22 and 23 for easy cleaning, held together by screws 24, having both a vertical slot 25 and a horizontal slot 26 is slipped, by means of slot 25, downward over the top of blade 20 until the bottom portion of block 21 engages with diametral channel 30 in thrust bearing 14. Co-operation of these elements is not absolutely essential, but makes for greater precision of the instrument with less freedom for unwanted movement and more support for the torsion measurement. Thereafter, deflectable strip 35 of convenient width and thickness, depending upon the general nature of the settlement, is inserted in horizontal slot 26, of clamping block 21. Strip 35 is of sufficient length to extend from its seated position in clamping block 21 to extend beyond vertical post 36. Cam latch 40, pivoted about pin 41 anchored in vertical flange 42 of clamping block 21 is brought downward to secure blade 20 and strip 35 against one another within their respective slots 25 and 26 in block 21. Graduated dial 45 is secured at right angles to blade 20 in order to clear under strip 35 by means of flanges 46 and 47 (46 not shown—but similar to 47) welded to halves 22 and 23, respectively, at their base. Removable fastening means 48 provide for disassembly for cleaning when desired.

After the various parts are positioned as above indicated, constant speed motor 2 is energized, and the torque thereof is transmitted through turntable 4, material under test in container 8, blade 20, clamping block 21 and deflectable strip 35.

As strip 35 is stilled at its free end by vertical post 36, strip 35 is arcuately bent to produce a deflection readable in the graduations of dial 45. As the stress on the settlement is proportional to the strain on said strip, and the strain may be calibrated in terms of weight, the number of grams essential to cause initial shear in the settlement under conditions of test may be recorded. Thus it becomes possible to assign a series of numerical values, of reproducible dimension, to the evaluation of the nature of a settlement characteristic of a particular paint formulation, namely; depth of settlement, rate of penetration, and force necessary to cause rupture of the settlement cake by shear. Heretofore, no simple means has been available for recording these qualities through reproducible measuring means so that direct comparison of a series of solid-in-liquid suspensions could be made.

Various modifications may be made in the design of the instrument, as is apparent. Those skilled in the art of instrument design are aware of equivalents to the specific means hereinbefore illustrated to accomplish the objectives of the invention, and the means described are to be construed only as illustrative, and limited only by the scope of the appended claims.

What I claim is:

1. An analytical instrument for measurement of settlement characteristics of solid-in-liquid suspensions which comprises a base, a horizontal turntable above said base, means to rotate said turntable at constant speed, stop means supported by said base, a bearing support adapted to be centrally mounted over containers of test substances, a thrust bearing rotatably supported by said bearing support whose axis of rotation is common with that of said turntable, means interiorly of said thrust bearing to accommodate an elongated blade therein, a blade, clamping means adapted to slide lengthwise of said blade, said clamping means further adapted to secure a length of deflectable strip normal to said blade and extending outward to said stop means, and means to inicate the degree of deflection of said strip upon transfer of turning moment from said turntable through the test substance, vertical elongated blade, and horizontal deflectable strip when said strip is stilled at its free end by contact with said stop.

2. An analytical instrument for measurement of settlement characteristics of solid-in-liquid suspensions which comprises a base, a horizontal turntable above said base driven by a constant speed motor, a vertical post supported by said base outside the turntable, a bearing support adapted to be centrally mounted over a container of test substance, a thrust bearing rotatably supported in said bearing support whose axis of rotation is common with the axis of rotation of said turntable, a vertical keyway interiorly of said thrust bearing adapted to accommodate an elongated blade and allow said blade to slide vertically within said keyway, a blade, clamping means adapted to slide lengthwise over said blade, said clamping means further adapted to secure a length of deflectable strip normal to said blade extending from said clamping means to said post and means to indicate the degree of deflection of said strip upon transfer of turning moment from said turntable through the test substance, vertical blade, clamp and horizontal deflectable strip when said strip is stilled at its free end by contact with said vertical post.

3. An analytical instrument for measurement of settlement characteristics of solid-in-liquid suspensions which comprises a base, a horizontal turntable above said base driven by a constant speed motor, a vertical post supported by said base outside the turntable, a bearing support adapted to be centrally mounted over a container of test substance, a thrust bearing rotatably supported in said bearing support whose axis of rotation is common with the axis of rotation of said turntable, a vertical dual keyway interiorly of said thrust bearing adapted to accommodate an elongated blade and allow said blade to slide vertically within said keyway, an elongated blade, clamping means adapted to slide vertically on said blade, said clamping means further adapted to secure a length of deflectable strip normal to said blade and extending from said clamping means to said post, means to lock said blade in said clamp and dial means to indicate the degree of deflection of said strip upon transfer of turning moment from said turntable through the test substance, vertical blade, clamp and horizontal deflectable strip when said strip is stilled at its free end by contact with said vertical post.

4. An analytical instrument for measurement of settlement characteristics of solid-in-liquid suspensions which comprises a base, a horizontal turntable above said base driven by a constant speed motor, a vertical post supported by said base outside the turntable, a bearing support adapted to be centrally mounted over a container of test substance, a thrust bearing rotatably supported in said bearing support whose axis of rotation is common with the axis of rotation of said turntable, a vertical dual keyway interiorly of said thrust bearing adapted to accommodate an elongated, essentially rectilinear, blade to allow said blade to slide vertically within said keyway, a rectilinear blade, a double-slotted clamping block adapted to slide vertically in a first slot over said blade, a second slot normal to said first slot and adapted to accommodate a length of deflectable strip horizontally therein, means associated with said clamp to lock said vertical blade and said deflectable strip in normal relation to one another in said clamp and graduated dial means to indicate the degree of deflection of said horizontal strip upon transfer of turning moment from said turntable through the test substance, vertical blade, clamp and horizontal deflectable strip when said strip is stilled at its free end by contact with said vertical post.

5. An analytical instrument for measurement of settlement characteristics of solid-in-liquid suspensions which comprises a horizontal turntable, means to drive said turntable at a constant speed not in excess of five revolutions per minute, a vertical stationary post exterior of said turntable, a trivet having a centrally disposed collar bearing adapted to be centrally mounted over containers of various diameters by means of adjustable feet slidably mounted on the legs of said trivet, a thrust bearing rotatably supported in said collar bearing, means interiorly of said thrust bearing to accommodate an elongated essentially rectilinear blade, a rectilinear blade adapted to be secured within said means, a vertically severable double-slotted clamping block, said first slot vertically through said block and adapted to slide over said blade, said second slot normal to said first slot and adapted to accommodate a length of deflectable strip, means associated with said block to lock said vertical blade and said deflectable strip therein in normal relation to one another, said strip extending outward to engage said post and graduated dial means to indicate the degree of deflection of said strip upon transfer of turning moment from said turntable through the test substance, vertical blade, clamp and horizontal deflectable strip when said strip is stilled at its free end by contact with said vertical post.

References Cited in the file of this patent

UNITED STATES PATENTS

| | | |
|---|---|---|
| 2,239,726 | Martin | Apr. 29, 1941 |
| 2,360,546 | Cardwell | Oct. 17, 1944 |
| 2,382,979 | Demb | Aug. 21, 1945 |
| 2,423,687 | Davis | July 8, 1947 |
| 2,484,761 | Stock | Oct. 11, 1949 |